United States Patent [19]

Goda

[11] Patent Number: 5,017,228
[45] Date of Patent: May 21, 1991

[54] LIQUID INK FOR SELECTIVE PRINTING

[75] Inventor: Hitoshi Goda, Osaka, Japan

[73] Assignee: Fuji Kagakushi Kogyo Co., Ltd., Osaka, Japan

[21] Appl. No.: 282,149

[22] Filed: Dec. 9, 1988

[30] Foreign Application Priority Data

Dec. 10, 1987 [JP] Japan .................. 62-312633

[51] Int. Cl.⁵ ........................................... C09D 11/06
[52] U.S. Cl. .................................. 106/28; 106/20; 106/22; 106/23; 106/27; 106/18.34; 568/28; 568/35
[58] Field of Search ............... 106/20, 22, 23, 27, 106/28, 18.34; 568/28, 35

[56] References Cited

U.S. PATENT DOCUMENTS

| | | | |
|---|---|---|---|
| 3,615,745 | 10/1971 | Crovetti | 568/35 |
| 3,632,859 | 1/1972 | Crovetti | 568/35 |
| 3,657,353 | 4/1972 | Crovetti | 568/28 |
| 3,663,623 | 6/1972 | Crovetti | 568/28 |
| 3,806,351 | 4/1974 | Bromberg et al. | 106/18.34 |
| 3,879,472 | 4/1975 | Martin | 568/28 |
| 3,901,935 | 8/1975 | Domenico | 106/18.32 |
| 4,018,611 | 4/1977 | Cramer et al. | 106/18.34 |
| 4,217,265 | 8/1980 | Dietz et al. | 106/23 |
| 4,666,526 | 5/1987 | Rolf et al. | 106/506 |

FOREIGN PATENT DOCUMENTS 53-1821 1/1978 Japan .
WO87/03292 6/1987 World Int. Prop. O. .

OTHER PUBLICATIONS

Chemical Abstracts, vol. 105, No. 10, 80803P.

Primary Examiner—William R. Dixon, Jr.
Assistant Examiner—Helene Klemanski
Attorney, Agent, or Firm—Armstrong, Nikaido, Marmelstein, Kubovcik & Murray

[57] ABSTRACT

A liquid ink composition for selective printing comprising a coloring agent and a vehicle comprising a non-drying oil as a main component and a dispersing agent, wherein an iodine-containing antifungal agent having the general formula (I):

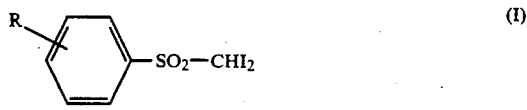

wherein R is a lower alkyl group or a halogen atom is contained. The ink composition has an excellent fungus resistance and retains a desired ink flowability on storage. Accordingly, an ink ribbon or ink roller impregnated with the ink composition can be stored without impairing printing properties such as printing durability while being kept from getting moldy.

3 Claims, No Drawings

LIQUID INK FOR SELECTIVE PRINTING

BACKGROUND OF THE INVENTION

The present invention relates to a liquid ink for selective printing. More particularly, it relates to a liquid ink for selective printing endowed with a fungus resistance.

Generally, a liquid ink for selective printing for use in printing media such as ink ribbon and ink roller contains a non-drying oil as a main component of the vehicle thereof.

Printing media such as ink ribbon and ink roller are liable to get moldy due to ink components, contaminants, dusts and moisture attached thereto, and the like.

A general means for the prevention of mold growth is to use an antifungal agent. However, it was found that when a usual antifungal agent was simply added to a selective printing liquid ink, the ribbon impregnated with the liquid ink was lowered in printing durability. Printing durability means the number of characters printed until the optical density of printed characters falls to the prescribed lower limit in the case of conducting a continuous printing using the same ink ribbon.

By the elucidation of the cause of the above phenomenon, it has been found that a selective printing liquid ink to which an antifungal agent is added gels on storage or assumes a thixotropic property though the ink does not cause gelation, which results in lowering the flowability of the ink. Hereinafter the above two phenomena, the gelation and the possession of thixotropic property are referred to collectively by the term "gelation". In particular, it has been found that when a printer is operated continuously, the internal temperature rises to 60° to 70° C. and the gelation of the ink is accelerated by such a high temperature condition.

An object of the present invention is to provide a selective printing liquid ink which has an excellent fungus resistance and does not impair the printing properties of printing media using the liquid ink as a result of storage.

This and other objects of the invention will become apparent from the description hereinafter.

SUMMARY OF THE INVENTION

The present invention provides a liquid ink composition for selective printing comprising a coloring agent and a vehicle comprising a non-drying oil, as a main component, and a dispersing agent, wherein an iodine-containing antifungal agent having the general formula (I):

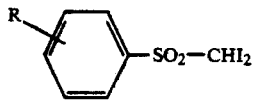

wherein R is a lower alkyl group or a halogen atom is further contained.

The addition of the specific antifungal agent represented by the formula (I) to a selective printing liquid ink imparts excellent fungus resistance thereto while retaining desired ink flowability on storage even at elevated temperatures.

DETAILED DESCRIPTION

In the present invention, the iodine-containing antifungal agent represented by the above formula (I) is used in consideration of its fungus resistance, its miscibility with its ink vehicle, its toxicity to the human body and secondary pollution. The antifungal agent (I) is desirable from a synthetic judgement of the following characteristics thereof: (i) The antifungal agent (I) has excellent antifungal activity. (ii) The antifungal agent (I) is excellent in durability of its antifungal activity, especially on storage at a high temperature. (iii) The antifungal agent (I) hardly adversely affects various characteristic properties of the ink. Especially, the antifungal agent (I) causes hardly only gelation of the ink on storage even at a high temperature.

The halogen atom represented by the symbol R in the formula (I) is preferably chlorine atom. The lower alkyl group represented by the symbol R in the formula (I) is preferably an alkyl group having 1 to 5 carbon atoms such as methyl, ethyl and propyl. The group R is preferably positioned at the para position of the phenyl group. Diiodomethyl p-tolyl sulfone and diiodomethyl p-chlorophenyl sulfone are desirable among the compounds represented by the formula (I) because of the superiority in the above points (i), (ii) and (iii).

The selective printing liquid ink of the present invention contains a coloring agent and a vehicle composed of a non-drying oil, as a main component, and a dispersing agent.

Any coloring agent and any vehicle which are conventionally used for conventional selective printing liquid inks can be suitably employed.

Examples of the coloring agent are pigments and dyes including carbon black, Oil Black, Oil Blue, Oil Red, Methyl Violet Base and Nigrosine Base. The amount of the coloring agent is usually from 5 to 50% by weight of the total amount of the ink composition.

Various non-volatile non-drying oils can be used as a main component of the vehicle. The term "non-drying oil" used herein means an oily substance which is hardly oxidized upon exposure to the air or hardly polymerized, and, as a result, does not form a hard dry film. Examples of the non-drying oil are vegetable oils such as rapeseed oil and castor oil; animal oils such as beef foot oil; mineral oil such as motor oil; synthetic oils such as olefin polymer oils (e.g. ethylene polymer oil, butylene polymer oil, and the like), diester oils (e.g. dioctyl phthalate, dioctyl sebacate, di(1-ethylpropyl) sebacate, dioctyl azelate, dioctyl adipate, and the like) and silicone oils (e.g. linear dimethyl polysiloxane having a low viscosity, and the like); and fatty acid such as isostearic acid and oleic acid.

The effect of the present invention is exhibited noticeably in the case of employing as a main component of the vehicle a non-drying oil which itself readily sets moldy, including the above-mentioned vegetable oils, animal oils and fatty acids. However, since fungus grows because of various factors, such as contaminants and the dusts and moisture attached to the printing medium, other than the components of the ink, the effect of the present invention is exhibited even in the case of employing a vehicle which itself is hard or difficult to get moldy.

Examples of the dispersing agent are sorbitan fatty acid ester, polyoxyethylene sorbitan fatty acid ester, glycerin fatty acid ester, propylene glycol fatty acid ester, polyethylene glycol fatty acid ester, polyoxyethylene alkyl ether, hardened castor oil derivative and polyoxyethylene castor oil.

Usually, the amounts of the non-drying oil and the dispersing agent are from 30 to 80% by weight and from 5 to 50% by weight, respectively, of the total amount of the ink composition.

In a preferred embodiment of the present invention, the antifungal agent (I) is contained in the liquid ink composition so as to satisfy equation (II) and equation (III):

$$0.1 \leq x \leq 6 \qquad \text{(II)}$$

$$50 \leq xy < 3{,}000 \qquad \text{(III)}$$

wherein x means the concentration (% by weight) of the antifungal agent in the liquid ink composition, and y means the initial viscosity (cPs) at 25° C. of the liquid ink composition. The initial viscosity of the liquid ink composition means the viscosity of the liquid ink composition immediately after the liquid ink composition is prepared by mixing the antifungal agent (I) with the ink components including a coloring agent and a vehicle.

According to the preferred embodiment, a desired flowability of the ink composition can be insured on storage for a long period of time at high temperatures of 60° to 70° C., and as a result, the printing properties such as printing durability are not impaired.

When the value, xy, is outside the range of the equation (III), the desired ink flowability cannot be insured on storage at such high temperatures, which results in a hindrance to printing, or the fungus resistance is poor.

When the concentration of the antifungal agent (I) is too low, a desired fungus resistance is not obtained. The use of the antifungal agent in an excessively high concentration adversely affects the various characteristic properties of the ink composition. Therefore, the antifungal agent (I) is preferably added so as to satisfy equation (II).

The ink composition of the present invention is used for printing media such as ink ribbon and ink roller. Accordingly, the viscosity of the ink composition is defined within a limited range because of general properties required for the ink employed in such uses, for instance, penetrating property and squeezing-out property. In view of this aspect, the value, y, in equation (III) is usually selected so as to satisfy equation (IV):

$$100 \leq y \leq 6{,}000 \qquad \text{(IV)}$$

Consequently, it is desirable that the antifungal agent (I) is used so as to satisfy equation (III), provided that x and y satisfy equation (II) and equation (IV), respectively.

The present invention is more useful for the inks containing vegetable oils, animal oils, or fatty acids than for the other inks free of these oils or acid.

PREFERRED EMBODIMENTS

The present invention is more specifically described and explained by means of the following Examples. It is to be understood that the present invention is not limited to the Examples, and various change and modifications may be made in the invention without departing from the spirit and scope thereof.

EXAMPLES 1 TO 2 AND COMPARATIVE EXAMPLES 1 to 10

Ink having the following formula and a viscosity of 500 cPs (hereinafter referred to as "basic ink composition A") was prepared.

| Basic ink composition A | |
|---|---|
| Component | Parts by weight |
| Pigment<br>Carbon black | 5 |
| Dye<br>Nigrosine Base | 20 |
| Non-drying oil | |
| Oleic acid | 30 |
| Motor oil | 35 |
| Dispersing agent<br>Sorbitan fatty acid ester | 10 |

Each of the antifungal agents mentioned below was added to the basic ink composition so that the concentration of the antifungal agent became that shown in Table 1, yielding various ink compositions.

Antifungal agent P: 2-(4-thiazolyl)benzimidazole
Antifungal agent Q: butyl p-oxybenzoate
Antifungal agent R: diiodomethyl p-tolyl sulfone A Möbius type ribbon cloth (cloth: a nylon fabric) having a length of 18 m and a width of 13 mm was impregnated with each ink composition in an amount of 23 parts by weight per 100 parts by weight of the cloth.

With respect to the obtained inks and the ink ribbons, the following tests were carried out.

(i) Fungus resistance

The ink ribbons were allowed to stand for one month in an atmosphere of 30° C. and 90% RH and thereafter it was observed whether fungus grew. The fungus growth was estimated according to the following criterion:

\*1:No fungus growth was observed.
\*2:The area covered with fungus was less than one-third of the area of the ink ribbon.
\*3:The area covered with fungus was more than one-third of the area of the ink ribbon.

(ii) Ink flowability after storage

After the ink was allowed to stand at 65° C. for 96 hours, the flowability of the ink was determined. The ink flowability was estimated according to the following criterion:

\*1:There was no change in flowability.
\*2:The thixotropic property of the ink became marked.
\*3:The ink gelled.

(iii) Printing durability

The ink ribbons which had been allowed to stand at 65° C. for 96 hours were installed in an impact dot printer (PC-PR 301 HC made by NEC Corporation) and printing was carried out continuously. The printing durability was determined as follows: A PCS value of 0.3 was taken as the lower limit of the optical density of the printed image. The PCS value was measured by means of a Macbeth PCM II densitometer using a filter "A". The number of characters printed until the optical density of printed characters fell to the lower limit was determined. The number of characters was taken as a measure of printing durability.

With respect to the ink ribbons before the storage, the printing durability was determined in the same manner as above.

The results of the above tests are shown in Table 1.

TABLE 1

(Basic ink composition A)

| | Antifungal agent | | Value "xy" | Fungus resistance | Printing durability (×10⁴ characters) | | Ink flowability after storage |
| --- | --- | --- | --- | --- | --- | --- | --- |
| | Kind | Concentration "x" (% by weight) | | | before storage | after storage | |
| Control | None added | | — | *3 | 350 | 350 | *1 |
| Com. Ex. 1 | P | 0.05 | 25 | *3 | 350 | 350 | *1 |
| Com. Ex. 2 | P | 0.1 | 50 | *3 | 350 | 350 | *1 |
| Com. Ex. 3 | P | 5 | 2,500 | *2 | 350 | 350 | *1 |
| Com. Ex. 4 | P | 6 | 3,000 | *1 | 350 | 320 | *2 |
| Com. Ex. 5 | Q | 0.05 | 25 | *3 | 350 | 350 | *1 |
| Com. Ex. 6 | Q | 0.1 | 50 | *3 | 350 | 350 | *1 |
| Com. Ex. 7 | Q | 6 | 3,000 | *3 | 350 | 350 | *1 |
| Com. Ex. 8 | Q | 7 | 3,500 | *3 | 350 | 250 | *2 |
| Com. Ex. 9 | R | 0.05 | 25 | *3 | 350 | 350 | *1 |
| Ex. 1 | R | 0.1 | 50 | *1 | 350 | 350 | *1 |
| Ex. 2 | R | 6 | 3,000 | *1 | 350 | 350 | *1 |
| Com. Ex. 10 | R | 7 | 3,500 | *1 | 350 | 80 | *3 |

EXAMPLES 3 to 4 and Comparative Examples 11 to 20

The same procedures as in Examples 1 to 2 except that the basic ink composition was changed to the following ink composition having a viscosity of 1,500 cPs (hereinafter referred to as "basic ink composition B") and the concentrations of the antifungal agents were changed to those shown in Table 2, were repeated to give ink compositions and ink ribbons.

With respect to the obtained ink compositions and ink ribbons, the same tests as in Examples 1 to 2 were conducted. The results are shown in Table 2.

| Basic ink composition B | |
| --- | --- |
| Component | Parts by weight |
| Pigment | 10 |
| Carbon black | |
| Dye | 20 |
| Nigrosine Base | |
| Non-drying oil | |
| Oleic acid | 30 |
| Motor oil | 20 |
| Dispersing agent | 20 |
| Sorbitan fatty acid ester | |

EXAMPLES 5 to 6 and Comparative Examples 21 to 30

The same procedures as in Examples 1 to 2 except that the basic ink composition having a viscosity of 3,000 cPs (hereinafter referred to as "basic ink composition C") and the concentrations of the antifungal agents were changed to those shown in Table 3, were repeated to give ink compositions and ink ribbons.

With respect to the obtained ink compositions and ink ribbons, the same tests as in Examples 1 to 2 were conducted. The results are shown in Table 3.

| Basic ink composition C | |
| --- | --- |
| Component | Parts by weight |
| Pigment | 20 |
| Carbon black | |
| Dye | 30 |
| Nigrosine Base | |
| Non-drying oil | |
| Oleic acid | 30 |
| Motor oil | 10 |
| Dispersing agent | 10 |
| Sorbitan fatty acid ester | |

TABLE 2

(Basic ink composition B)

| | Antifungal agent | | Value "xy" | Fungus resistance | Printing durability (×10⁴ characters) | | Ink flowability after storage |
| --- | --- | --- | --- | --- | --- | --- | --- |
| | Kind | Concentration "x" (% by weight) | | | before storage | after storage | |
| Control | None added | | — | *3 | 350 | 350 | *1 |
| Com. Ex. 11 | P | 0.05 | 75 | *3 | 350 | 350 | *1 |
| Com. Ex. 12 | P | 0.1 | 150 | *3 | 350 | 350 | *1 |
| Com. Ex. 13 | P | 2 | 3,000 | *2 | 350 | 350 | *1 |
| Com. Ex. 14 | P | 3 | 4,500 | *2 | 350 | 350 | *1 |
| Com. Ex. 15 | Q | 0.05 | 75 | *3 | 350 | 350 | *1 |
| Com. Ex. 16 | Q | 0.1 | 150 | *3 | 350 | 350 | *1 |
| Com. Ex. 17 | Q | 2 | 3,000 | *3 | 350 | 350 | *1 |
| Com. Ex. 18 | Q | 3 | 4,500 | *3 | 350 | 350 | *1 |
| Com. Ex. 19 | R | 0.05 | 75 | *3 | 350 | 350 | *1 |
| Ex. 3 | R | 0.1 | 150 | *1 | 350 | 350 | *1 |
| Ex. 4 | R | 2 | 3,000 | *1 | 350 | 350 | *1 |
| Com. Ex. 20 | R | 3 | 4,500 | *1 | 350 | 150 | *3 |

TABLE 3

(Basic ink composition C)

| | Antifungal agent | | Value "xy" | Fungus resistance | Printing durability ($\times 10^4$ characters) | | Ink flowability after storage |
| --- | --- | --- | --- | --- | --- | --- | --- |
| | Kind | Concentration "x" (% by weight) | | | before storage | after storage | |
| Control | None added | | — | *3 | 350 | 350 | *1 |
| Com. Ex. 21 | P | 0.05 | 150 | *3 | 350 | 350 | *1 |
| Com. Ex. 22 | P | 0.1 | 300 | *3 | 350 | 350 | *1 |
| Com. Ex. 23 | P | 1 | 3,000 | *3 | 350 | 350 | *1 |
| Com. Ex. 24 | P | 2 | 6,000 | *2 | 350 | 350 | *1 |
| Com. Ex. 25 | Q | 0.05 | 150 | *3 | 350 | 350 | *1 |
| Com. Ex. 26 | Q | 0.1 | 300 | *3 | 350 | 350 | *1 |
| Com. Ex. 27 | Q | 1 | 3,000 | *3 | 350 | 350 | *1 |
| Com. Ex. 28 | Q | 2 | 6,000 | *3 | 350 | 350 | *1 |
| Com. Ex. 29 | R | 0.05 | 150 | *3 | 350 | 350 | *1 |
| Ex. 5 | R | 0.1 | 300 | *1 | 350 | 350 | *1 |
| Ex. 6 | R | 1 | 3,000 | *1 | 350 | 350 | *1 |
| Com. Ex. 30 | R | 2 | 6,000 | *1 | 350 | 120 | *3 |

In addition to the materials and ingredients used in the Examples, other materials and ingredients can be used in the Examples as set forth in the specification to obtain substantially the same results.

The ink composition which contains the specific antifungal agent, preferably in a specific proportion in connection with the viscosity of the ink, has an excellent fungus resistance and retains a desired ink flowability on storage. Accordingly, an ink ribbon or ink roller impregnated with the ink composition can be stored without imparing printing properties such as printing durability while being kept from getting moldy.

What is claimed is:

1. In a liquid ink composition for use in an ink ribbon or ink roller for selective printing comprising a coloring agent and a vehicle comprising a non-drying oil as a main component and a dispersing agent, the improvement which comprises said ink containing 0.1 to 6% by weight an iodine-containing compound, sufficient to act as an effective antifungal agent, having the general formula (I):

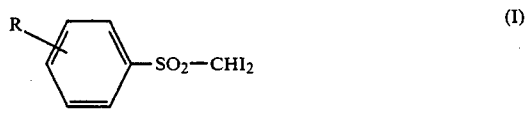

wherein R is a lower alkyl group or a halogen atom and which has an initial viscosity in cPs at 25° C. such that the product of the initial viscosity and the concentration is between 50 and 3000.

2. The liquid ink composition of claim 1, having an initial viscosity of about 100 to 6,000 cPs at 25° C.

3. The liquid ink composition of claim 1, consisting essentially of said coloring agent and said vehicle and wherein said non-drying oil is a member selected from the group consisting of vegetable oils, animal oils and fatty acids.

* * * * *